J. M. NESS.
FISH LURE.
APPLICATION FILED AUG. 16, 1913.
1,101,655.
Patented June 30, 1914.
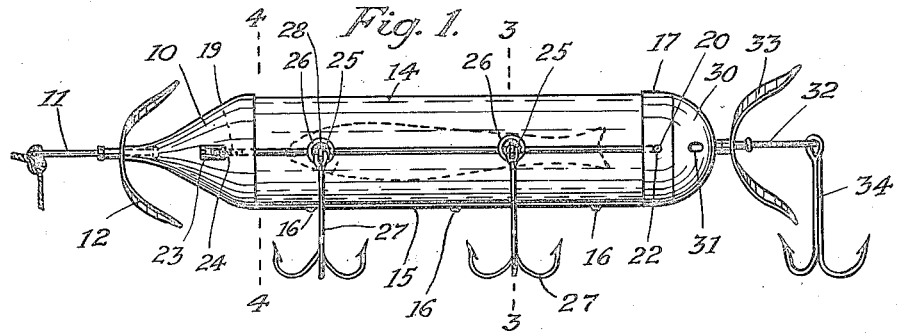
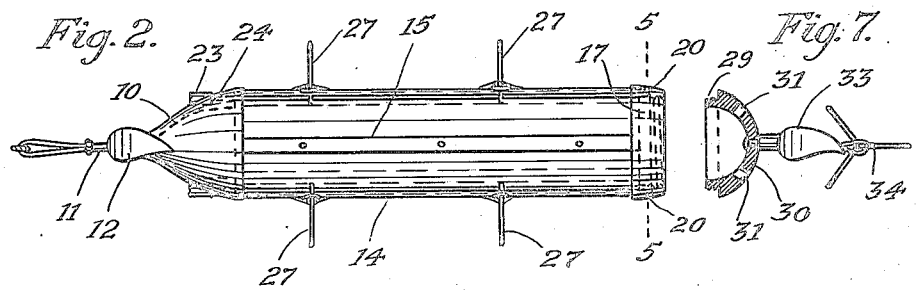
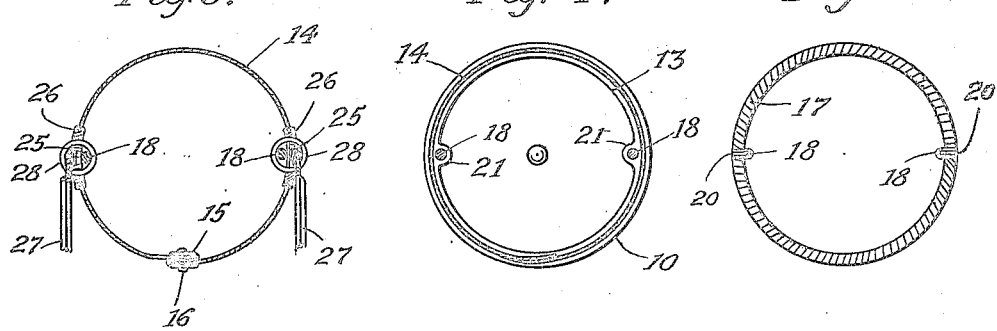
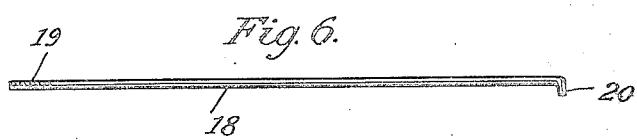
Witnesses:
Theo. Lagaard.
H. A. Bowman.
Inventor:
Joseph M. Ness.
By F. A. Whiteley
his Attorney.

UNITED STATES PATENT OFFICE.

JOSEPH M. NESS, OF MINNEAPOLIS, MINNESOTA.

FISH-LURE.

1,101,655.  Specification of Letters Patent.  Patented June 30, 1914.

Application filed August 16, 1913. Serial No. 785,097.

*To all whom it may concern:*

Be it known that I, JOSEPH M. NESS, a citizen of the United States, residing at Minneapolis, in the county of Hennepin and State of Minnesota, have invented certain new and useful Improvements in Fish-Lures, of which the following is a specification.

My invention relates to fish lures and has for its object to provide means for the holding of live bait such as a frog or minnow in such manner that it will not suffer injury and may be used over an extended period for catching numerous fish, in combination with means for interchangeably holding hooks of the desired size, together with other features adding to the effectiveness of my device as a lure. I accomplish these results primarily by providing a casing of the requisite length, which may be cylindrical or of other shape as desired, but has the central walls thereof transparent and surrounding a chamber adapted to receive and exhibit the live bait such as a minnow or frog. Means are provided for interchangeably securing a hook or hooks to some part of the casing, and inlets are provided to the casing preferably adjacent the point where the mouth of the minnow will be and also outlets at the rear of the casing whereby the minnow will be provided with a supply of fresh water and air. The minnow is at all times plainly visible and yet is protected from the attack of biting fish and from concussion with the surface of the water as the lure is cast as well as from the drawing effect of being pulled through the water by means of the transparent walled casing. The manner of forming the said transparent casing and securing it bodily to form said chamber in combination with the means for interchangeably securing the hooks to the lure are important features of my invention.

The full objects and advantages of my invention will appear in connection with the detailed description thereof and are particularly pointed out in the claims.

In the drawings, illustrating the application of my invention in one form,—Figure 1 is a side view of a lure embodying the principles of my invention and having a plurality of hooks secured thereto, the live bait being indicated in dotted lines. Fig. 2 is a top plan view showing the removable rear cap withdrawn from the casing proper. Fig. 3 is a section on line 3—3 of Fig. 1. Fig. 4 is a section on line 4—4 of Fig. 1. Fig. 5 is a section on line 5—5 of Fig. 2. Fig. 6 is a view of the rod for holding the cap and ring together. Fig. 7 is a section through the rear cap.

As illustrated, I provide a front cap 10 formed of nickeled steel or other metal as desired, which is preferably conical in shape and is provided with a stem 11 extending to the center of the conical head 10 upon which may be rotatably mounted a double spoon 12 of any bright flashing material, it being noted that the spoon 12 is no necessary part of my invention and may be employed or not as desired. As above pointed out, the front cap 10 may preferably be conical in form having a circular base 13 in which is secured the end of a cylinder 14 formed of any desired transparent material, preferably of tough and substantial celluloid. This cylinder will preferably be formed of a single piece having the edges thereof overlapped and being respectively bound by a reversely turned strip 15 of any desired metal such as sheet zinc, lead, tin, etc., the turns of said metal overlapping the edges of the celluloid and being secured together by rivets 16 which pass through the several turns of the sheet metal and the overlapping thickness of the celluloid. The sheet metal serves the double purpose of effectively binding the celluloid into a closed cylinder and of providing a keel weight which has the effect of causing the apparatus to assume a relatively horizontal position with the part 15 down when the lure is in the water.

The rear end of the cylinder 14 is held within a ring 17 and the ring 17 and cap piece 10 are secured together by means of one or more rods 18. Each of rods 18, as shown in detail in Fig. 6, comprises a shank having the end threaded, as indicated at 19, the free end being formed with a right-angled bend 20. The cap 10 is provided with inwardly disposed lugs 21, said lugs having bores extending through the same and through the wall of the cap 10, said bores being parallel with the axis of said cap. In assembling, the threaded end 19 of the rods 18 is extended through the bores in lugs 21 and the bends 20 are pushed through apertures 22 in the ring 17. A screw nut 23 is then threaded onto the end of rod 18 and by engagement with a shoulder 24 formed on the outside of cap 10 and surrounding the apertures through lugs 18 the ring 17 and cap 10 are drawn firmly upon the transparent cylinder 14 and the entire structure is rigidly secured together. The rods 18 also serve as a means for interchangeably securing hooks to the walls of the cylinder 14. It is quite essential that the hooks should be close to the point where the live bait is visible. Apertures 25 are provided through the walls of the cylinder 14, preferably on opposite sides thereof, and some of said apertures must be adjacent the point where the head of a minnow in the cylinder 14 will normally come, as indicated in Fig. 1. These apertures will be in line with and adjacent the point where the rods 18 extend along the walls of cylinder 14 and could preferably have the edges bound with metal eyelets 26. Hooks 27 of any desired size or character may be provided with rings 28 which are inserted through the openings 25 and the rods 18 are extended through said rings thereby giving the hooks a free swinging connection to the rods 18 along the side walls of the transparent cylinder 14. The ring 17 is interiorly threaded and is adapted to receive a threaded portion 29 of a rear cap 30 by means of which said rear cap is removably secured upon the ring 17 and closes the chamber in cylinder 14 except for some small apertures 31 formed in the cap 30 for permitting water which enters the chamber through apertures 25 to circulate within the chamber and leave through apertures 31. If desired the rear cap 30 may have a stem 32 centrally swiveled thereto upon which stem a flashing spoon 33 may be rotatably mounted and to which may also be secured, if desired, a hook for the float.

The operation of my device will be apparent. Hooks will be attached to the rods 18 of such size and character as the nature of the fishing where the lure is used would require. With the rear cap 30 removed a minnow will be introduced within cylinder 14 with the head toward the front cap 10. The rear cap 30 is then secured in position and the lure placed in water, with which it immediately fills through the apertures 25 and 31. The lure is secured by front stem 11 to any desired line and is cast in the usual way, its weight and shape facilitating long and accurate casting. The minnow within the casing 14 is protected from the concussion when the lure strikes the water. Immediately after the lure strikes the water it begins to sink and upon being drawn forwardly will assume a horizontal position with the keel weight 15 down. The minnow swims naturally in the chamber 14 receiving fresh water through the apertures 25 and being protected by the casing from the drag of the lure through the water. The fish to be caught may be first attracted by the flashing spoon or the bright metal of the caps 10 and 30 and seeing the minnow swimming naturally strikes for the head of the minnow and is almost certain to be hooked by some of the hooks 27. The hook 34 serves to catch a fish striking from the rear.

I claim:

1. A fish lure comprising a casing having front and rear metal caps and intermediate transparent walls, one of said caps being provided with a longitudinal shouldered opening and the other of said caps having a transverse opening in the wall thereof, a rod within the casing for holding said caps and walls rigidly assembled having a threaded end extending through the longitudinal opening and a right-angled bend extending through the transverse opening, a screw nut on the threaded end of the rod and hooks removably secured to the casing by said rod.

2. A fish lure comprising a casing having front and rear metal caps and intermediate transparent walls, one of said caps being provided with a longitudinal shouldered opening and the other of said caps having a transverse opening in the wall thereof, a rod for holding said caps and walls rigidly assembled having a threaded end extending through the longitudinal opening and a right-angled bend extending through the transverse opening, a screw nut on the threaded end of the rod, and hooks removably secured to said rod.

3. A fish lure comprising a casing having front and rear metal caps and intermediate transparent walls, said walls being provided with openings, rods extending inside of the transparent walls across said openings and securing the caps and walls together, rings extending through said openings and around said rods, and hooks in the rings.

4. A fish lure comprising a casing having front and rear metal caps and intermediate transparent walls, said walls being provided with openings, rods extending inside of the transparent walls across said openings and securing the caps and walls together, rings extending through said openings and around said rods, and hooks in the rings, said rods being removably secured in position so that the same may be withdrawn and the hooks changed.

5. A fish lure comprising a casing having a front cap, a rear ring, intermediate transparent walls and a rear cap removably secured to the rear ring, said front cap being provided with longitudinal shouldered openings and the ring having transverse openings, rods within the casing having threaded portions extending through the longitudinal openings and right-angled turns extending through the openings in the ring, screw nuts on the rods outside of the front cap and hooks secured in position alongside of said walls by said rods.

6. A fish lure comprising a casing having front and rear metal caps and a cylindrical transparent portion between the caps, said cylindrical portion being formed of a sheet of transparent material with the side edges overlapped, and a strip of metal bent over and secured to both edges and extending between the overlapped portion, said strip of metal serving to hold the transparent sheet in cylindrical form and providing a keel sinker for causing the casing to assume definite position when in the water, means for holding the caps and cylindrical portion rigidly assembled, and hooks secured in position alongside said cylindrical portion.

In testimony whereof I affix my signature in presence of two witnesses.

JOSEPH M. NESS.

Witnesses:
H. A. BOWMAN,
F. A. WHITELEY.